July 28, 1964 J. D. HILL 3,142,824

ANALOG STORAGE CIRCUIT

Filed Oct. 16, 1963

James D. Hill

INVENTOR

Joseph A. Genovese & Max L. Libman

Att'y

United States Patent Office 3,142,824
Patented July 28, 1964

3,142,824
ANALOG STORAGE CIRCUIT

James D. Hill, Takoma Park, Md., assignor, by mesne assignments, to Control Data Corporation, Minneapolis, Minn., a corporation of Minnesota Filed Oct. 16, 1963, Ser. No. 316,688
7 Claims. (Cl. 340—173)

This invention relates to reading machines, and particularly to analog storage circuits for such machines.

It is not uncommon for reading machines to compare an unknown character with optical (e.g. masks) or electronic (e.g. resistor adders) standards, and to provide comparison signals which correspond to the degree of match of the unknown with each standard. In many machines the comparison signals are temporarily stored in capacitors, after which the stored signals are sampled by a comparator which yields a character-identity signal as a result of a comparison of all of the signals.

Examples of machines which operate in the above manner are disclosed in Rabinow et al. Patent No. 3,104,369; Holt application No. 236,020, filed November 7, 1962; Rabinow application No. 115,267, filed June 6, 1961; and Rabinow Patent No. 2,933,246. The capacitor storage circuits of most modern reading machines must be very accurate owing to the use of semi-conductor circuits which provide for only several volts swing between a "good" character match and a "poor" character match in simple machines (e.g. for number only). In alpha numeric machines the difference between an "*a*" and "*s*" or a "Q" and "O" may be represented by a signal of one to two volts. The usual capacitor storage circuit (e.g. in the above machines) uses one diode as a unidirectional device through which the capacitor is charged by means of the comparison signal, and another diode (or the equivalent) through which the capacitor charge is sampled during read-out. Of course, there is one (at least) capacitor-diodes storage circuit for each character which the machine is expected to identify. If perfectly uniform diodes were available, the above circuit would be theoretically (and in practice) correct and adequate. However, even the best diodes have non-linear voltage drop characteristics over their useful power range. To make matters worse even hand-tested and selected diodes demonstrate slightly different voltage drop characteristics at the same operating power. As a result, the voltage drop across the first diode of the conventional circuit subtracts from the charging signal reaching the capacitor, and when the capacitor is sampled for read-out the voltage drop across the second diode further subtracts from the stored signal. Summarizing, there are two non-uniform conditions to contend with. First, the voltage drop characteristics across the two diodes of one capacitor storage circuit (for one character) may be different from each other. Second, the voltage drop sum for each circuit (for all of the characters) varies from one character circuit to another, and the variations are not precisely predictable.

My invention solves the above problems by using the same diode for both charging and sampling the capacitor for read-out. Thus, the diode voltage drop characteristic is the same (same diode) during the charging and the sampling cycle. Moreover, in my capacitor-diode circuit the arrangement is such that the voltage drop across the diode during capacitor charging is in one direction (e.g. −6 volts analog signal dropped to −5.3 volts capacitor-charging signal), while the voltage drop across the same diode during sampling has the effect of providing a more negative signal (e.g. −5.3 volt stored signal is sampled to provide a signal identical to the original −6 volt signal). Accordingly, in each capacitor storage circuit, the voltage drop characteristics of the respective diodes cancel so that during sampling, the comparator experiences the true comparison signals on which to base the character identification.

Since diodes are unidirectional devices, it is not obvious to use the same diode for both charging and sampling a capacitor because the implication would appear to be that the same diode is required to conduct alternately in one and then in the opposite direction. However, my capacitor-diode storage circuit is so arranged that the diode is not called upon to be bidirectional, and yet, it is used during capacitor-charging and sampling. The details of my circuit are given later, but the underlying concept is to charge the capacitor (connected to ground) with a negative signal through the diode and thereby store a signal equal to the comparison (true) signal, less the voltage drop across the diode. For instance, the true signal may be −6.0 volts and the voltage drop across the diode 0.7 volt (approximately correct for a silicon diode at a power of 6 volts and 50 microamperes), in which case the capacitor experiences a charging voltage of −5.3 volts. I sample the capacitor through the same diode with an interrogation pulse that is calculated to be always more negative (e.g. −10 volts) than any possible stored signal. Thus, the diode will conduct from negative (−5.3 volts) to the "more negative" sampling pulse source through the same diode. In so doing, the effect of the voltage drop across the diode (0.7 volt) is to be "subtracted" from the −5.3 volt signal, making it "more negative," i.e. −6 volts, which is the true signal.

An object of my invention is to provide a circuit for storing an analog signal in a capacitor, and for accurately ascertaining at a later time the charging signal by which the capacitor was previously energized to store the analog signal.

Another object of my invention is to provide a capacitor-diode temporary storage circuit wherein the same diode is used for charging and for sampling the capacitor in a manner such that the voltage drop characteristic of the diode is neutralized.

A further object of the invention is to provide a storage circuit having unusual acuracy, and which solves problems of component non-linearity arising in equipment which requires one or many storage circuits, such as optical and magnetic reading machines, computers, computer-like devices, and others.

Other objects and features of importance will become apparent in following the description of the illustrated form of the invention which is given by way of example only.

*Preface*

Figures 1, 2, 3, 4:
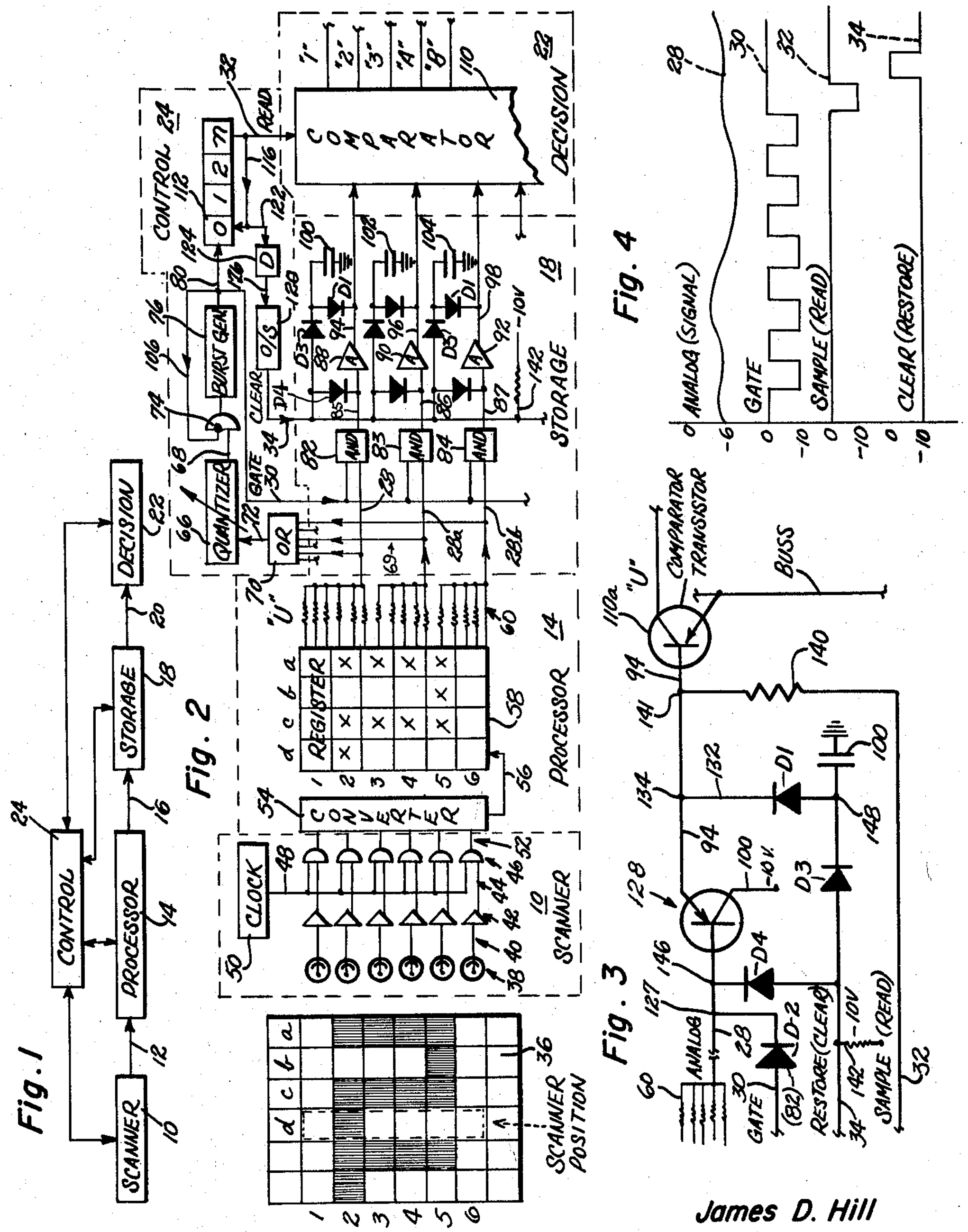
FIGURE 1 is a block diagram showing the main subassemblies of a reading machine with which my invention is useful.
FIGURE 2 is a largely schematic view of a reading machine equipped with my analog storage circuits.
FIGURE 3 is a schematic view showing one of my analog storage circuits and a single comparator transistor for one character, it being understood that a separate storage circuit similar to that shown in FIGURE 3 and a separate comparator transistor (or the equivalent) is used for each character that the reading machine is expected to identify.
FIGURE 4 is a timing diagram to facilitate description of the operation of the circuit shown in FIGURE 3.

FIGURE 1 shows a logical division of sub-assemblies of a character reading machine. Most machines have a scanner as at 10, to examine the unknown characters, and the outputs of the scanner are conducted on the wires of cable 12 to a processer 14. The processer arranges the data extracted from the character and its background (by the scanner 10) in an orderly fashion so that the processed information can be conducted by cable 16 to the storage section 18 of the reading machine. From the storage section, the stored information is conducted on the lines of cable 20 to decision section 22 which identifies the unknown (scanned) character. The main subassemblies are all timed and otherwise synchronized by means of the control section 24 of the machine.

My analog storage circuit (FIGURE 3) can be considered as part of storage section 18, or as an adjunct thereto. I use at least one storage circuit (FIGURE 3) for each character which the machine is expected to identify. As shown by the legends to the left of FIGURE 3, several signals are used in applying my invention to a character reading machine. These are the analog or information signal on line 28, the gate signals on line 30, the read trigger or capacitor-sampling signal on line 32, and the clear or restore signal on line 34. Signals such as these are either already available or can be made available in reading machines. However, to show one way of providing these signals and as background information for my invention, reference is made to FIGURE 2 showing a considerable portion of a reading machine like that disclosed in the A. Holt application Serial No. 263,020. It is to be clearly understood that my invention is not in any way limited to use with any specific machine.

In FIGURE 2, area 36 has images of two characters projected thereon by means of an optical system (not shown). The area is subdivided vertically (*a*–*d*) and horizontally (1–6) to facilitate explanation.

As illustrated, the images of the characters are swept horizontally past a vertical row of photocells 38 forming a part of scanner 10. The analog outputs of the photocells are conducted on lines 40 to individual amplifiers 42 whose output lines 44 form respective inputs to a group of AND gates 46. The other input of each AND gate is conducted on line 48 attached to a source 50 of clock pulses which operates in time with the horizontal motion of the character images. The output lines 52 from the AND gates are connected as inputs to a parallel-to-serial converter 54 whose output line 56 is operatively connected with shift register 58.

Converter 54 and the shift register 58, together with correlation devices 60 are considered to be the processer section 14 of the reading machine (FIGURE 1), although the terminology can be varied to include a greater or lesser portion of the machine in any of the subassemblies. As in the Holt application, shift register 58 is a serial shift register, while the individual correlation devices 60 (there being at least one for each unknown character that the machine can identify) are resistor adders. A typical resistor adder constructed for the character "U," will have its resistor assertion points connected to stages *2c*, *3c*, *4c*, *5c*, *5b*, *5a* *4a*, *3a*, and *2a*, of the serial shift register, and it is understood that negation points and weighing can be used just as in Patent No. 3,104,369. Accordingly, as the data stored in the register is serially shifted therethrough, the degree of match between the unknown character ("U" in this instance) and its resistor adder will go from poor to optimum, and then again to poor. At the same time the correlation devices for the other characters that the machine can identify will provide varying signals, but none will ever reach the same optimum as the "U" adder.

Quantizer 66 or the equivalent (e.g. a one shot multivibrator) in control section 24 of the machine detects when the information stored in the register 58 begins to approach registration with any one of the resistor adders 60, by monitoring the analog signals on lines 28, **28*a*, 28*b*, etc. in the following manner. Lines 69 are connected to lines 28, 28*a*, etc., and are inputs to OR gate 70. The output line 72 of gate 70 is connected as the input to quantizer 66, whose threshold is manually adjustable. Thus, when the analog signal on any one (or more) line 28, 28*a*, etc. passing gate 70 exceeds the quantizer threshold, quantizer 66 fires thereby providing a signal on line 68. Line 68 is connected to the passive terminal of inhibit gate 74. Thus, the quantizer signal passes gate 74 whose output signal triggers a pulse burst generator 76 to provide a succession of pulses on its output line 80. Gate pulse line 30 (FIGURES 2–4) is connected to the output line 80 of the burst generator 76, and to each of the analog AND gates 82, 83, 84 (and others, not shown) whose only other inputs are the analog signal lines 28, 28*a*, 28*b*. Accordingly, during each gate signal (see FIGURE 4) the analog AND gates 82, 83, 84 are opened allowing analog signals on their respective lines 28, 28*a*, 28*b* from their respective resistor adders to pass over the gate output lines 85, 86, 87 to amplifiers 88, 90 and 92. The amplifier output lines 94, 96 and 98 are connected to individual storage capacitors 100, 102, 104, there being one capacitor for each unknown character that the machine is capable of identifying. Since my analog storage circuit 26 is intimately connected with this part of the reading machine, a more detailed description of capacitor charging, gating, sampling and restoring (FIGURES 3 and 4) is given later. At this time attention is returned to the control section 24** (FIGURES 1 and 2) of the reading machine.

Burst generator 76 can be designed or preset to provide a pulse burst of "*n*" pulses in time with the stepping of the information through register 58. Thus, the burst generator (which provides the gate signals on line 30) can provide a preselected number of pulses depending on the number of times that the data moving through the register 58 is to be examined. The value of the analog output signals on lines 28, **28*a*, etc. represent the degree of match between the character standards (resistor adders 60) and the data (number and arrangement of bits) in register 58 as it shifts therethrough, and these "degree of match" signals are allowed to pass gates 82, 83, 84 by the gating signals on line 30, into capacitors 100, 102, etc. through amplifiers 88, 90, 92**.

During the time that the gating cycle is in process, it is possible that the quantizer input signal on line 72 will drop below the threshold value and again rise to yield a false starting signal for burst generator 76 while it is already in operation. To overcome this problem the output of the burst generator is fed back on line 106 to the inhibit terminal of gate 74 so that the burst generator cannot be restarted while it is in operation. Alternatively, a flip flop can be interposed in line 106 to be set by the first pulse of the burst, and reset by the last (or by the read trigger signal on line 32 which amounts to the same thing).

When the burst generator has completed its cycle there are two further steps to be taken. One is to trigger the comparator 110 (by sampling all of the capacitors), and the other is to restore (clear) the capacitors 100, 102 etc. to an initial state. Thus, a ring counter 112 (or the equivalent) is stepped each time that there is an output pulse from the burst generator conducted on line 80. At the "*n*'th" step of the ring counter, the last stage provides a signal on line 32 which has the effect of triggering the comparator 110 by sampling the capacitors. This signal is also fed back over line 116 to reset counter 112. The function of the comparator is to examine the stored charges in each capacitor 100, 102, etc., and provide an output signal identifying the unknown character which is represented by the capacitor having the "best" charge most negative as shown but (nearest to zero, nearest to any reference, most positive, etc. are equivalent). Structural details of comparators such as 110 are found in U.S. Patent No. 3,104,369.

A very short time after the capacitors are sampled by the sample or read trigger signal on line 32, the capacitors 100, 102, etc. are restored to their initial condition by a signal on line 34. This line conducts the output signal of a one shot multivibrator 120 which is triggered by the signal on line 32 via lines 116, 122, the delay 124, and the one shot input line 126. For design reasons (described later) the signal on line 34 is normally negative (shown in FIGURES 2 and 3 connected by line 142 to —v. source), and the output of one shot 120 is positive to thereby drive the signal on line 34 to a zero volt clear or restore signal (FIGURE 4). In this way the capacitors are restored to an initial state (for example at ground level) and the reading machine is prepared to identify the next character in a manner identical to that described above.

*Analog Storage Circuit*

Attention is directed to FIGURES 3 and 4. Typical signals which can be expected on lines 28, 30, 32 and 34 (FIGURE 3) are shown in a timing chart (FIGURE 4). For the purpose of explanation only it is assumed that the "best" signal selected by comparator 110 is the most negative signal, and it is further assumed that the resistor adders 60 are so designed that a "perfect" match between a given unknown character and its adder 60 will provide a signal of —6 volts. Thus, the expected analog signal on line 28 of FIGURE 3 is shown in FIGURE 4 for an ideal case. The gate signals on line 30 are —10 volt pulses from a D.C. level of zero volts. The signal on line 32 is normally held at zero volts and driven to —10 volts for the sample or read trigger. The clear or restore signal on line 34 is normally held at —10 volts, and is driven to zero volts for restoring the capacitors.

The storage circuit (FIGURE 3) is constructed and operates as follows. The analog signal line 28 is connected to the base of transistor 128 (amplifier 88 in FIGURE 2). The collector of transistor 128 is connected to a —10 volt source, and line 94 is connected to the transistor emitter. The gating signal of zero volts is applied to the base of transistor 128 via gate-signal line 30, gate diode D–2 (gate 82 in FIGURE 2) and point 127 of analog signal line 28. Thus, the zero volt signal on line 30 through diode D–2, and the collector connection to —10 volt source clamps the transistor 128 so that analog signal (never more negative than —10 volts) do not pass transistor 128. However, at the time of a —10 volt gating pulse on line 30, the analog signal on line 28 is conducted by transistor 128 to charge capacitor 100 by way of line 94, juncture point 134 therein, line 132 and diode D–1. Diode D–1 is an ordinary diode (without unusual properties), such as a 1N625 or many commercially available equivalents. Capacitor 100 is connected to ground, and the anode and cathode of diode D–1 are arranged as shown. Thus, diode D–1 will pass the analog signal because it is more negative than the charge in the capacitor. As shown in FIGURE 4, there is a succession of gate pulses on line 30 (although one can be sufficient), and it is understood that during each gate pulse, capacitor 100 experiences the charging analog signal on line 94 at the time of the gate pulse. Further, the capacitor will "ignore" signals which are more positive than any previous charging signal, i.e. it will be charged with and hold the most negative ("best") signal during the entire gating cycle.

When charging capacitor 100 with an analog signal of —6 volts, there will be a voltage drop across diode D–1, which is characteristic of the diode. Assume that the voltage drop is 0.7 volt, so that the capacitor actually experiences only —5.3 volts for charging, whereas the true signal is —6 volts. As explained below, my circuit will read out or sample the capacitor in a manner such that a signal equal to the true (—6 volt) signal is applied to the base of comparator transistor 110*a*.

The sample or read signal on line 32 is normally at zero volts and is driven to —10 volts for sampling capacitor 100 (and in a like manner are all other capacitors 102, etc. which are not shown in FIGURE 3). When the —10 volt sample signal occurs, the gate signal on line 30 is at zero volts (FIGURE 4), and the restore signal on line 34 at —10 volts (as shown). Under these conditions, capacitor 100 is sampled through diode D–1 and resistor 140 connected in the sample line 32 ahead of its juncture at 141 with line 94. At the instant that the capacitor discharge starts; the signal at the juncture 141 of diode D–1, resistor 140 and the base of transistor 110*a*, will go to —6 volts in the following way. The —10 volt sample signal is more negative than the —5.3 volt charge stored in capacitor. Thus, with the anode and cathode of diode D–1 arranged as mentioned before, the diode D–1 is properly arranged for conduction toward the more negative —10 volt sample source (on line 32 through resistor 140). In this direction of current, the voltage drop —0.7 volt across diode D–1 is added to the —5.3 volt signal resulting in a signal of —6 volts which is identical to the true signal, i.e. the analog signal on line 28 by which capacitor 100 was originally charged. Comparator transistor 110*a*, therefore, experiences the true analog match voltage signal originating from the resistor adder associated with circuit 26.

Thereafter, capacitor 100 is restored by means of a zero volt signal on line 34. As stated before, the restore or clear signal is normally held at —10 volts on line 34 which is connected at points 146 and 148 to the analog signal line 28 and line 132 as shown. Diodes D–3 and D–4 provide for the restoration of capacitor 100 to its clear state (at ground level in the illustrated circuit) when the signal on line 34 is driven from —10 volts to zero. At this time my storage circuit is in condition to be used in the identification of another character.

It is understood that various modifications can be made without departing from the protection of the claims. In particular, the signal values and polarities are given by way of example only.

I claim:

1. In a reading machine having means providing a plurality of analog signals, the improvement comprising analog storage means for said signals, said storage means including a capacitor, means including a diode for charging said capacitor with a signal corresponding to a said analog signal, and an output circuit operatively connected with the same diode to read out the signal stored on said capacitor through said diode in a manner such that the diode characteristic is effectively cancelled.

2. In an electrical device having means to provide a plurality of analog true signals originating from a plurality of sources, a storage circuit for each analog signal, each storage circuit comprising a storage capacitor, means including a diode through which said capacitor charged by a said analog signal so that the capacitor stores a second signal which is equal to the true analog signal less the signal attenuation due to the voltage drop across said diode, and means to sample the stored signal through the same said diode in a manner such that the voltage drop across said diode is added to the signal voltage stored in said capacitor to reproduce the original true signal.

3. The subject matter of claim 2 wherein said sample means include means providing a sample signal of a polarity and value with respect to the stored signal such that the voltage drop across the diode during sampling provides said reproduced signal.

4. In a reading machine having a plurality of conductors of analog signals, and a comparator to select one of the signals against all others as being the analog signal representative of the identity of an unknown character, the improvement comprising a plurality of temporary storage circuits for said analog signals, each storage circuit comprising a storage capacitor, means including a transistor and a diode together with a gate for gating a true said analog signal into said capacitor through said diode so that the stored signal is equal to said analog signal less the voltage drop across said diode, means for providing a capacitor-sampling signal of the same polarity as said stored signal but of greater magnitude in a manner such that said capacitor is sampled through the same said diode so that the voltage drop across said diode during sampling adds to the stored signal to provide a second signal of the same value as said true signal, whereby the voltage drops across said diode during capacitor charging and capacitor sampling respectively are effectively can-called, and means to conduct said second signal to said comparator.

5. The subject matter of claim 4 wherein said transistor has its base connected to one of said analog signal conductors, and its emitter and collector connected with a potential source and a line with which said diode is connected.

6. The subject matter of claim 5 and means connected between said capacitor and said diode to restore said capacitor to a predetermined state after said sampling.

7. An analog signal storage circuit for an analog signal of a given polarity, said circuit comprising a storage capacitor, a conductor for said analog signal connected to said capacitor, a diode interposed in said conductor and having its anode and cathode arranged to pass said signal of said given polarity to said capacitor so that a second signal equal to the true analog signal less the voltage drop across the diode is stored in said capacitor, and means providing a sample signal for said capacitor, said sample signal being of the same polarity as said stored signal but of a greater magnitude so that said capacitor is sampled through the same diode causing the voltage drop across the diode to add to the stored signal and thereby produce a signal which is of the same value as the true analog signal by which said capacitor was originally charged.

No references cited.